US011370028B2

(12) United States Patent
Herzog

(10) Patent No.: US 11,370,028 B2
(45) Date of Patent: Jun. 28, 2022

(54) METHOD FOR PRODUCING THREE-DIMENSIONAL COMPONENTS

(71) Applicant: CL SCHUTZRECHTSVERWALTUNGS GMBH, Lichtenfels (DE)

(72) Inventor: Frank Herzog, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 0 days.

(21) Appl. No.: 15/541,345

(22) PCT Filed: Jan. 12, 2016

(86) PCT No.: PCT/EP2016/050472
§ 371 (c)(1),
(2) Date: Jun. 30, 2017

(87) PCT Pub. No.: WO2016/113255
PCT Pub. Date: Jul. 21, 2016

(65) Prior Publication Data
US 2017/0368757 A1  Dec. 28, 2017

(30) Foreign Application Priority Data
Jan. 14, 2015  (DE) .......................... 102015000100.0

(51) Int. Cl.
*B22F 10/20*  (2021.01)
*B22F 10/30*  (2021.01)
(Continued)

(52) U.S. Cl.
CPC .............. *B22F 10/20* (2021.01); *B22F 3/162* (2013.01); *B29C 64/153* (2017.08);
(Continued)

(58) Field of Classification Search
CPC ......... B33Y 10/00; B33Y 50/00; B33Y 50/02; B29C 64/153; B29C 64/393;
(Continued)

(56) References Cited

U.S. PATENT DOCUMENTS 6,492,651 B2  12/2002  Kerekes
6,657,155 B2 *  12/2003  Abe ...................... B22F 3/1055
219/121.6
(Continued)

FOREIGN PATENT DOCUMENTS

CN  1753747 A  3/2006
CN  100377816 C  4/2008
(Continued)

OTHER PUBLICATIONS

EP Search Report PCTEP2016050472.
(Continued)

*Primary Examiner* — Michael P Wieczorek
(74) *Attorney, Agent, or Firm* — Dority & Manning, P.A.

(57) ABSTRACT

A method for producing three-dimensional components by successively solidifying layers of a powder construction material solidified by means of electromagnetic radiation, in particular bundled radiation such as laser radiation or electron radiation, at the locations corresponding to the respective cross-section of the component, in particular SLM or SLS. A device comprising a support device, the height of which can be adjusted within a construction chamber, is provided for supporting the component including a coating device for applying layers of the construction material onto the support device or onto a previously formed layer and comprising an irradiating device for irradiating layers of the construction material in some regions to solidify layers. A surface section to be coated is scanned with respect to the evenness of the section prior to the application of a new
(Continued)

layer. In the event of an unevenness exceeding a known tolerance range, the unevenness is removed or leveled out.

16 Claims, 2 Drawing Sheets

(51) Int. Cl.
*B22F 3/16* (2006.01)
*B29C 64/153* (2017.01)
*B29C 64/393* (2017.01)
*B33Y 10/00* (2015.01)
*B33Y 50/00* (2015.01)
*B33Y 50/02* (2015.01)
*B29C 64/214* (2017.01)
*B29C 64/218* (2017.01)

(52) U.S. Cl.
CPC .......... *B29C 64/214* (2017.08); *B29C 64/218* (2017.08); *B29C 64/393* (2017.08); *B33Y 10/00* (2014.12); *B33Y 50/00* (2014.12); *B33Y 50/02* (2014.12); *B22F 10/30* (2021.01); *Y02P 10/25* (2015.11)

(58) Field of Classification Search
CPC ..... B29C 64/214; B29C 64/218; B22F 10/20; B22F 10/28; B22F 10/30; B22F 10/31; B22F 10/38
See application file for complete search history.

(56) References Cited

U.S. PATENT DOCUMENTS

| | | | |
|---|---|---|---|
| 7,003,864 B2 | 2/2006 | Dirscherl | |
| 7,047,098 B2* | 5/2006 | Lindemann | B22F 3/1055 700/118 |
| 7,537,722 B2 | 5/2009 | Andersson et al. | |
| 7,754,135 B2 | 7/2010 | Abe et al. | |
| 10,052,712 B2 | 8/2018 | Blackmore | |
| 2002/0104973 A1 | 8/2002 | Kerekes | |
| 2004/0026807 A1 | 2/2004 | Andersson et al. | |
| 2007/0176312 A1* | 8/2007 | Clark | B22F 3/1055 264/40.1 |
| 2007/0295440 A1* | 12/2007 | Stucker | B23K 20/10 156/73.1 |
| 2012/0093674 A1 | 4/2012 | Abe et al. | |
| 2013/0168902 A1 | 7/2013 | Herzog et al. | |
| 2013/0277891 A1 | 10/2013 | Teulet | |
| 2013/0280439 A1 | 10/2013 | Hess et al. | |
| 2014/0147328 A1* | 5/2014 | Abe | B22F 3/1055 419/28 |
| 2015/0037601 A1 | 2/2015 | Blackmore | |
| 2017/0001379 A1* | 1/2017 | Long | B33Y 50/02 |
| 2017/0246683 A1* | 8/2017 | Jones | B29C 64/153 |

FOREIGN PATENT DOCUMENTS

| | | |
|---|---|---|
| DE | 19853978 C1 | 5/2000 |
| DE | 19905067 A1 | 8/2000 |
| DE | 10058748 C1 | 7/2002 |
| DE | 10300959 C5 | 10/2013 |
| DE | 102012012412 A1 | 3/2014 |
| DE | 102014204528 A1 | 9/2015 |
| EP | 1296788 B1 | 1/2005 |
| JP | 2002/115004 A | 4/2002 |
| JP | 2004/277881 A | 10/2004 |
| JP | 2008194107 A | 8/2008 |
| WO | WO2001/081031 A1 | 11/2001 |
| WO | WO2004/056509 A1 | 7/2004 |
| WO | WO2012/069037 A2 | 5/2012 |

OTHER PUBLICATIONS

German Search Report Corresponding to Application No. 102015000100 dated May 24, 2017.
Chinese Search Report Corresponding to Application No. 201680057030 dated May 6, 2019.
Machine Translated Japanese Office Action Corresponding to Application No. 2017537235 dated Oct. 10, 2019.

* cited by examiner

METHOD FOR PRODUCING THREE-DIMENSIONAL COMPONENTS

CROSS-REFERENCE TO RELATED APPLICATIONS

This application is a United States national stage entry of an International Application serial no. PCT/EP2016/050472 filed Jan. 12, 2016 which claims priority to German Patent Application serial no. 10 2015 000 100.0 filed Jan. 14, 2015. The contents of these applications are incorporated herein by reference in their entirety as if set forth verbatim.

The invention relates to a method for producing three-dimensional objects by successive solidification of layers of a powder-type construction material that can be solidified using electromagnetic radiation, especially directional radiation such as laser radiation or electron beam radiation. In the method mentioned, the radiation is directed to the positions corresponding to the respective cross-section of the objects for melting on the construction material. For that purpose, an apparatus is provided, comprising a carrying device that is movable in height within a construction chamber for carrying the object; by means of a coating device, construction material is applied layer by layer onto the carrying device and then each layer is specifically molten, and after cooling, the material solidifies to a solid three-dimensional body. The irradiation device of the apparatus used for the method comprises a scanner, which in a process-controlled manner directs the directional radiation to said positions of the construction material layer to be solidified.

Additive construction processes, as described above and in which layer by layer is applied and solidified, often take very long periods. It can happen that in a relatively late phase of the construction process solidification or coating errors occur, which then lead to wastage of the produced three-dimensional body, when the construction process is continued and completed without corrective actions. This may result in that, for example, a 24-hour construction process runs properly for 23 hours and in the last hour a coating error or an error in connecting of layers being solidified occurs. Especially connecting errors lead to a delamination of layers, i.e. sections of a last layer detach because of an insufficient inner seal, and they bend upwards for especially thermal reasons such that the application of a new layer leads to a layer that is too thin for a proper course of the construction process.

From DE 103 00 959 C5 it is known to assign a shear blade to a blade assembly of the construction material coater, by which the particles projecting upwards can be cut off an area to be coated. However, such a shear blade is only suited to remove or turn down particles projecting upwards from the area to be coated due to material splashes, such that they cannot interfere with the subsequent coating process.

Basically, also from DE 198 53 978 C1 it is known to provide a smoothening device to avoid wear of a coating blade, with which the treatment surface of the form body being disposed in the build volume can be entirely smoothened.

The invention is based on the object of designing a method with the features of the preamble of claim 1 such that it can be performed quickly with as less impact of the construction room atmosphere as possible, and a removal can specifically be performed. This object is solved in that, prior to an application of a layer, a portion of the surface to be coated is scanned regarding the surface to be coated thereof, and, in case of unevennesses exceeding a certain range of tolerance, said unevennesses are removed or smoothed out.

The method first provides for regular verification, i.e. after each application of a layer or after each second, third, fourth application of a layer, whether the surfaces to be coated are actually smooth. In prior art, a smoothing action is—as described above—performed prior to each coating process, whether it is necessary or not. This results in a significant dirt accumulation in the construction section and is therefore to be considered negative. The invention, however, specifically examines, whether a smoothening or a removal of sections to be coated is required in the first place. Only when it is determined that a certain tolerance has been exceeded, a smoothening or removal process is initiated; otherwise, the coating takes place without initiating a smoothening action.

In further developments of the invention, unevennesses determined are locally detected, and a removal element is used specifically and locally limited to remove or smooth out unevennesses hindering a next smooth application of layer. Unevenness coordinates are detected using a sensor and are stored, and specific removal measures are initiated using said determined unevenness coordinates.

In contrast to the prior art methods, in which a subsequent smoothening or removal of the entire layer is carried out prior to each new application of construction material, in the method according to the invention it is at first examined, if and where a mechanical or otherwise smoothening re-working of the layer is required in the first place. If this is affirmed after performing the first step, then a removal process is specifically started using defective spot coordinates. This means that a method according to the invention can run faster than a prior art method, because smoothening or removing in any other way is not necessary each time, but only when a real defective spot has been determined. In addition, the layer may be re-worked not over the entire layer section, but only where a defective spot has been determined. This preserves the construction room atmosphere, since with every layer removal it is to be feared that construction material particles are for example catapulted upwards into the protective gas atmosphere of the construction room by a smoothening element and there contaminate the atmosphere. In addition, mechanical or thermal stresses of the body being in construction are largely avoided, as mechanical processes are only carried out, where they are really necessary, and not always a smoothening of the entire area is carried out.

The scanning of the area to be coated can be carried out optically, e.g. using an optical scanner capable of recognizing and localizing particles protruding upwards, such as a delamination. The coordinates of this upward protruding section are accurately detected and then a rework process is started accurately and specifically there. However, the scanning of the area can also be carried out by an acoustic method, e.g. using an ultrasound sensor capable of accurately determining the distance between sensor height and layer. Unevennesses detected are removed mechanically where they are localized. In this connection, localized means that a relatively small-area removal element is guided to the upward protruding layer spot via a robot arm or the like, and there the removal process is carried out. Any other layer spots that are free from defects remain unaffected by the removal process. The mechanical removal can be carried out by a smoothening roll, which is e.g. arranged at the free movable end of the robot arm, wherein a very specific suction of smoothening particles can also be carried out.

However, it is also possible to melt off unevennesses determined or to roll them into the layer. Therefore, a local heating of the unevennesses is possibly useful.

The scanning of the area to be coated can be carried out prior to each coating process. In order to accelerate the method further, it can be sufficient to carry out the scanning of the areas to be coated only in the edge or extreme ranges of a component in construction. As extreme ranges e.g. fins protruding from a component wall or other relatively slim protrusions are considered, which relatively easily tend to a delamination in a construction process.

Furthermore, it can be advantageous to perform a local check of layer surface sections that turned out to be critical in previous removal processes, using the scanning device. In other words, after a new coating and melting on process, possibly not the entire component layer is checked, but only a component layer section that in one of the preceding coating and melting on processes tended to a delamination. This also accelerates the method.

With particular advantage, it is possible to keep the account of the results of the detection and the revisions, i.e. to record the unevennesses determined regarding their x- and y-coordinates in a quality management protocol. It can also be useful to not only record the coordinates of a layer spot that was to be re-worked, but to also record the removal depth or the type of the removal process and/or the removal area so that after finishing the component it can be weighted up, whether the re-working process can have negative effects on the quality of the finished component.

The invention is explained in more detail by means of advantageous exemplary embodiments in the figures of the drawings. In which.

Figure 1:
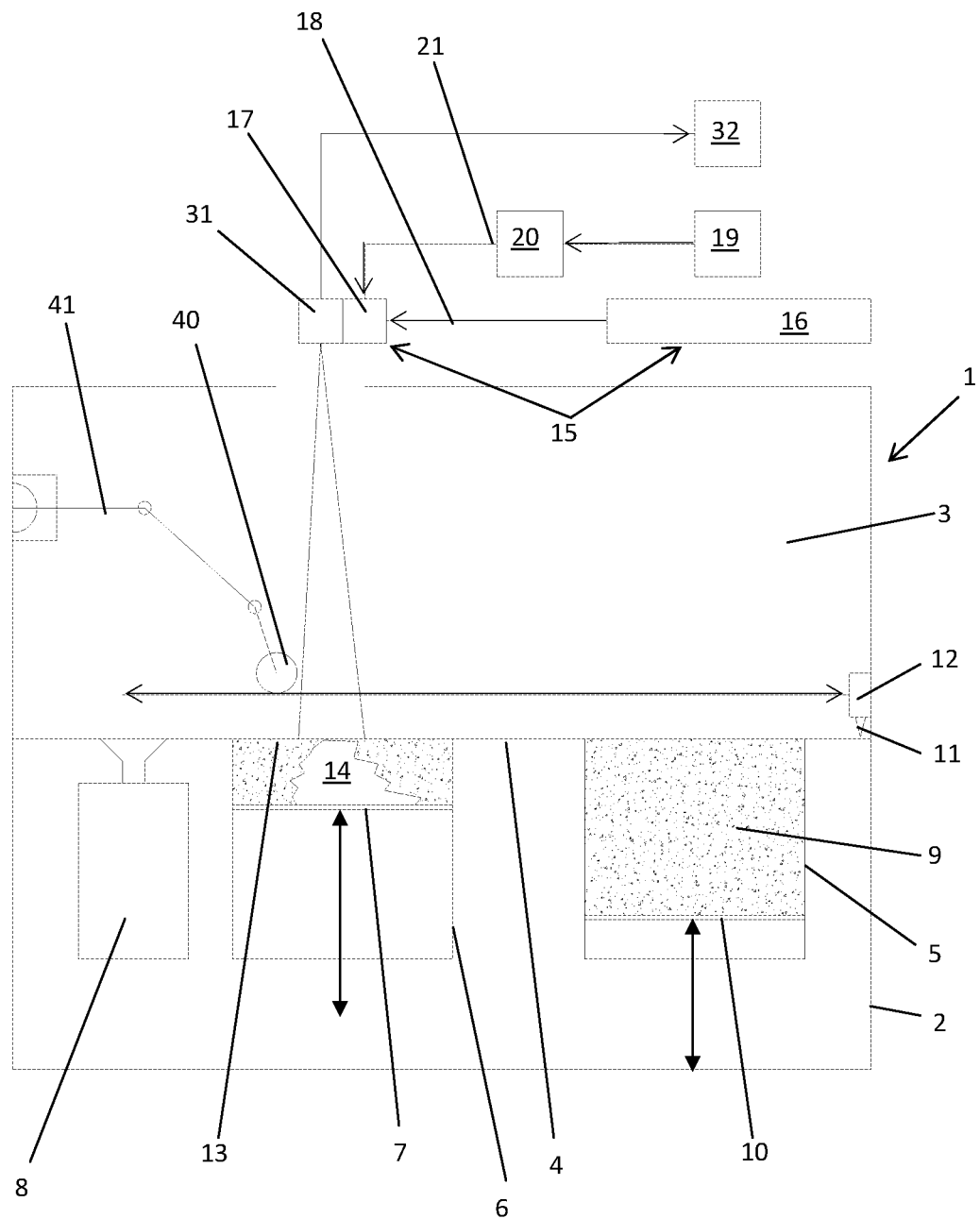
FIG. 1 shows a schematic diagram of an apparatus, in which the method according to the invention can be performed.

The apparatus 1 shown in FIG. 1 comprises a housing 2, in which a process chamber 3 is accommodated. In a process chamber bottom 4, a reservoir 5, especially for powder-type construction material, a construction chamber 6 with a height adjustable carrier 7, and an overflow tank 8 are arranged. The construction material 9 is slightly pressed upwards by a height adjustable metering chamber bottom 10 and can be applied to the surface 13 to be coated of a partially finished component 14 by the blade 11 of a horizontally movable coater 12. Excess construction material is dropped into the overflow tank 8.

Above the process chamber 3 or in the upper section thereof, an irradiation device 15 consisting of a laser 16 and a scanner 17 is arranged. The highly energetic beam 18 of the laser 16 is guided into the scanner 17 and is there deflected in x- and y-directions to specifically irradiate and thus solidify a powder layer on the surface of the component 14. The scanner 17 is controlled by construction data stored in storage 19 and processed in a processor 20 such that a processor output 21 can provide a scanner input with scanner information.

Above the construction chamber 6, furthermore, a sensor 31 is arranged that is suited and formed to scan the surface 13 to be coated, especially of the component 14, prior to a coating process by the coater 12 regarding its evenness. The scanning can be carried out such that the sensor 31 is either formed as an optical sensor that either emits a sensor beam itself and analyzes the information reflected by the surface, or uses the beam of the scanner for that purpose. In each case, it is required that the sensor 31 is suited to detect and store unevenness coordinates in the sensor scan process. Storing the unevenness coordinates that can also be referred to as defective spot coordinates regarding the surface to be coated is carried out in storage 32. In the storage 32, not only the x- and y-coordinates of the unevennesses determined are stored, but also the number of the layer that can be transmitted from the storage 19 for the construction data. However, it is also possible that the sensor 31 is e.g. formed as an ultrasound sensor in the style of an echo sounder sensor or the like.

When the sensor 31 detects an unevenness on the surface to be coated of especially the component 14, then the x-, y- and z-coordinates (the z-coordinate is the layer number) are stored in the storage 32 and a removal device e.g. in the form of a smoothening roll 40 is activated, which is attached to a robot arm 41 controlled by the storages 19, 32. Using said smoothening roll 40, a local treatment and a local removal of the unevenness spots determined are carried out, the coordinates of which are stored in storage 32. But it is also possible to melt off unevennesses determined, i.e. to evaporate them using the radiation 18 of the laser 16 or to roll them into the surface using a roll that is similarly attached like the smoothening roll 40.

The scanning of the surface 13 using the sensor 31 can be carried out prior to each new coating process, but it is possibly also sufficient to carry out a check only after each second, third or fifth coating process. The scanning can further be carried out in the edge and extreme ranges of a component only, i.e. in thin fins and the like that are in a relatively high danger of delamination.

In the storage 32 it is not only stored that an unevenness was present and that it was removed, but the removal process is also accurately recorded regarding the removal area, the removal depth and the like, because a conclusion can be drawn therefrom of which type the unevenness is.

Figure 2:
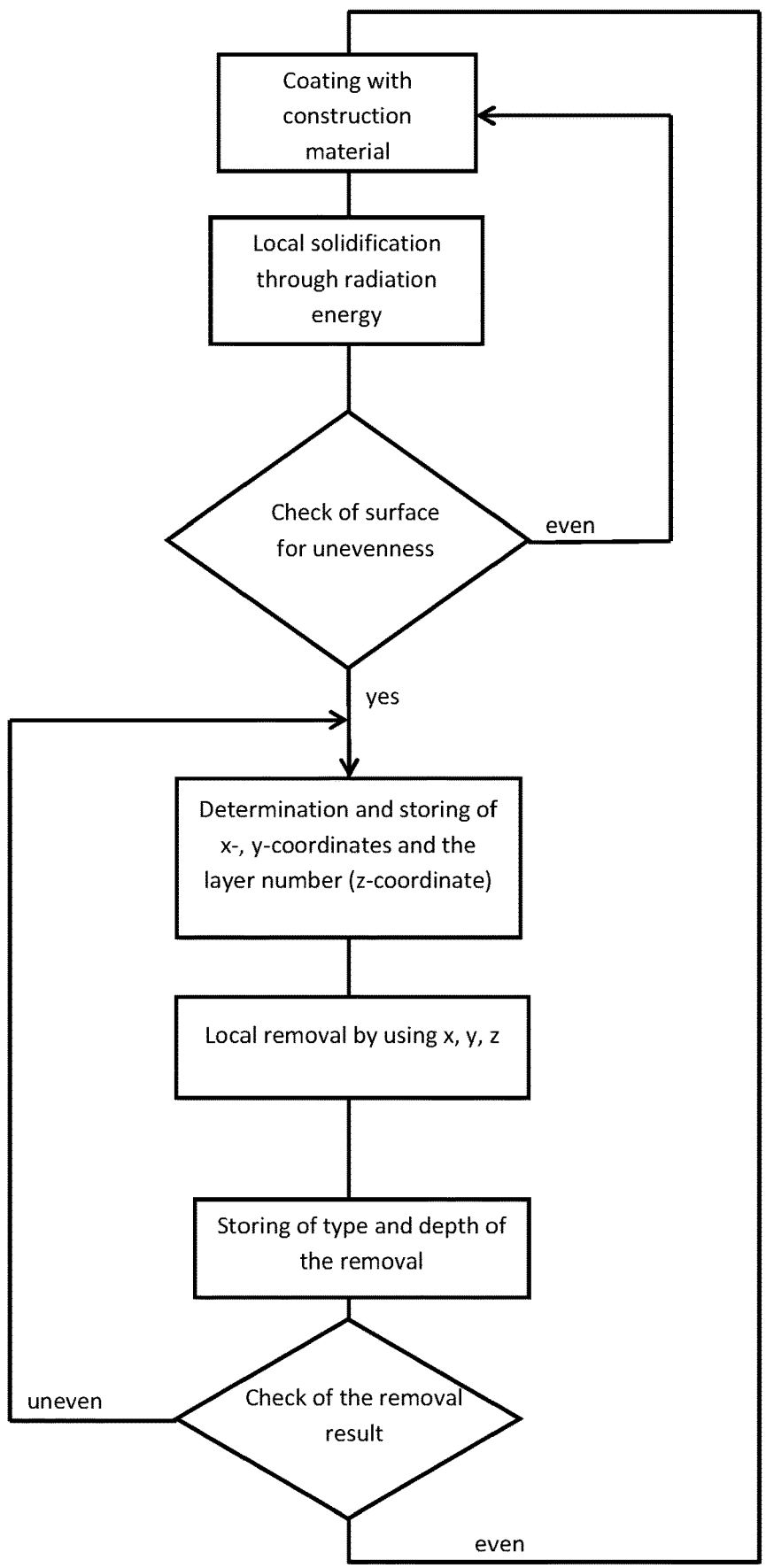
FIG. 2 shows a schematic flow for performing the quality management of a surface to be coated.

In FIG. 2 in the style of a flow chart, it is again shown how a determination and correction of layer surfaces are carried out.

In a first step, an area to be coated is coated with construction material, which can be carried out as mentioned above by the coater 12 and the coater blade 11. Then in a second step, the layer is specifically and locally solidified using the radiation 18 of the laser using the scanner 17. Then in a third step, it is determined by the sensor 31, whether the layer is even. If this is admitted, then a coating with construction material according to step 1 can again be carried out. If unevennesses are determined, the xy-coordinates and the layer number are recorded and stored. Then a local removal using the xy-coordinates is carried out and then a storing of type and depth of the removal using the x-, y- and z-coordinates.

Then a new local check of the removal result can be carried out. If it turns out that the layer is still uneven, it can again be recorded, where the layer is still uneven and where another removal needs to be done. If the layer, however, proves to be even, then a new layer application with construction material is carried out according to step 1.

It still seems to be significant to note that the area of the removing processing can be slightly larger than the actual area of unevenness to ensure a really even and smooth processing result. The actual removal coordinates can for example be recorded in the storage 32 of the apparatus to later be able to make quality management statements.

LIST OF REFERENCE NUMBERS

1 Apparatus
2 Housing

3 Process chamber
4 Process chamber bottom
5 Metering container
6 Construction chamber
7 Carrier
8 Overflow tank
9 Construction material
10 Metering chamber bottom
11 Blade
12 Coater
13 Surface
14 Component
15 Irradiation device
16 Laser
17 Scanner
18 Beam of 16
19 Storage
20 Processor
21 Output of 20
31 Sensor
32 Storage
40 Smoothening roll
41 Robot arm

The invention claimed is:

1. A method of additively manufacturing a three-dimensional component, the method comprising:
for respective ones of a plurality of sequentially applied layers of powder-type construction material having been selectively irradiated with electromagnetic radiation from an electromagnetic radiation source configured to melt or sinter at least a portion thereof and thereby provide a respective one of a plurality of sequentially irradiated surface layers:
determining based at least in part on a scanner input from a scanner, an unevenness coordinate set defining an unevenness comprising a delamination at a localized portion of the respective one of the plurality of sequentially irradiated surface layers, the scanner having scanned at least a portion of the respective one of the plurality of sequentially irradiated surface layers;
storing the unevenness coordinate set including an x-coordinate, a y-coordinate and a z-coordinate at the unevenness, wherein the z-coordinate is a layer number;
storing data pertaining to a type of removal corresponding to the unevenness coordinate set; and
when the unevenness exceeds a threshold, prior to applying a next one of the plurality of sequentially applied layers of powder-type construction material:
guiding a roll to the localized portion of the respective one of the plurality of sequentially irradiated surface layers; and
mechanically smoothing, with the roll, material from the localized portion of the respective one of the plurality of sequentially irradiated surface layers without disturbing the respective one of the plurality of sequentially irradiated surface layers outside of the localized portion, wherein mechanically smoothing material comprises rolling the unevenness into the layer at the localized portion of the respective one of the plurality of sequentially irradiated surface layers; and
when the unevenness falls below a threshold, allowing application of the next one of the plurality of sequentially applied layers of powder-type construction material even though the unevenness has been determined.

2. The method of claim 1, wherein respective ones of the plurality of sequentially irradiated surface layers are scanned optically.

3. The method of claim 1, wherein respective ones of the plurality of sequentially irradiated surface layers are scanned acoustically.

4. The method of claim 1, wherein mechanically smoothing material is performed after a phase of locally heating the unevenness.

5. The method of claim 1, wherein the scanner scans only one or more edge or overhang portions of the respective ones of the plurality of sequentially irradiated surface layers.

6. The method of claim 1, wherein mechanically smoothing material from the localized portion of the respective one of the plurality of sequentially irradiated surface layers comprises controlling the roll in x- and y-directions over the respective one of the plurality of sequentially irradiated surface layers.

7. The method of claim 1, further comprising:
using the stored unevenness coordinate set for mechanically smoothing material at the unevenness.

8. The method of claim 7, further comprising:
using the stored data pertaining to the type of removal to draw a conclusion as to a type of the unevenness.

9. A method of additively manufacturing a three-dimensional component, the method comprising:
for respective ones of a plurality of sequentially applied layers of powder-type construction material having been selectively irradiated with electromagnetic radiation from an electromagnetic radiation source configured to melt or sinter at least a portion thereof and thereby provide a respective one of a plurality of sequentially irradiated surface layers:
determining based at least in part on a scanner input from a scanner, an unevenness coordinate set defining an unevenness at a localized portion of the respective one of the plurality of sequentially irradiated surface layers;
storing the unevenness coordinate set including an x-coordinate, a y-coordinate and a z-coordinate at the unevenness, wherein the z-coordinate is a layer number;
storing data pertaining to a type of removal corresponding to the unevenness coordinate set; and
determining the unevenness exceeds a threshold, wherein in response to determining the unevenness exceeds the threshold, prior to applying a next one of the plurality of sequentially applied layers of powder-type construction material:
guiding a roll to the localized portion of the respective one of the plurality of sequentially irradiated surface layers; and
mechanically smoothing, with the roll, material from the localized portion of the respective one of the plurality of sequentially irradiated surface layers without disturbing the respective one of the plurality of sequentially irradiated surface layers outside of the localized portion, wherein mechanically smoothing material is performed after a phase of locally heating the unevenness.

10. The method of claim 9, wherein respective ones of the plurality of sequentially irradiated surface layers are scanned optically.

11. The method of claim 9, wherein respective ones of the plurality of sequentially irradiated surface layers are scanned acoustically.

12. The method of claim 9, wherein mechanically smoothing material is performed to an area larger than an actual area of the unevenness.

13. The method of claim 9, wherein the scanner scans only one or more edge or overhang portions of the respective ones of the plurality of sequentially irradiated surface layers.

14. The method of claim 9, wherein mechanically smoothing material from the localized portion of the respective one of the plurality of sequentially irradiated surface layers comprises controlling the roll in x- and y-directions over the respective one of the plurality of sequentially irradiated surface layers.

15. The method of claim 9, further comprising:
using the stored unevenness coordinate set for mechanically smoothing material at the unevenness.

16. The method of claim 15, further comprising:
using the stored data pertaining to the type of removal to draw a conclusion as to a type of the unevenness.

* * * * *